(12) United States Patent
Jung et al.

(10) Patent No.: US 11,453,238 B2
(45) Date of Patent: Sep. 27, 2022

(54) WHEEL BEARING ASSEMBLY

(71) Applicant: ILJIN GLOBAL Co., Ltd, Seoul (KR)

(72) Inventors: Yun Ho Jung, Seoul (KR); Bo Young Jang, Seoul (KR)

(73) Assignee: ILJIN GLOBAL Co., Ltd, Seoul (KR)

(*) Notice: Subject to any disclaimer, the term of this patent is extended or adjusted under 35 U.S.C. 154(b) by 0 days.

(21) Appl. No.: 17/081,078

(22) Filed: Oct. 27, 2020

(65) Prior Publication Data
US 2021/0039433 A1 Feb. 11, 2021

Related U.S. Application Data

(63) Continuation of application No. PCT/KR2018/004965, filed on Apr. 27, 2018.

(51) Int. Cl.
F16C 19/18 (2006.01)
F16C 25/06 (2006.01)
(Continued)

(52) U.S. Cl.
CPC ...... B60B 27/0005 (2013.01); B60B 27/0036 (2013.01); B60B 27/0084 (2013.01);
(Continued)

(58) Field of Classification Search
CPC ...... F16C 19/185; F16C 19/186; F16C 43/04; F16C 2223/10–18; F16C 2326/02;
(Continued)

(56) References Cited

U.S. PATENT DOCUMENTS 6,790,145 B2 9/2004 Niebling et al.
2002/0018608 A1 * 2/2002 Miyazaki ............ B60B 27/0084
384/544
(Continued)

FOREIGN PATENT DOCUMENTS

JP 2004345370 A * 12/2004 ............ F16C 33/768
JP 2009287699 A * 12/2009 ............ F16C 35/063
(Continued)

OTHER PUBLICATIONS

Machine Translation of JP-2009287699-A (Year: 2009).*
(Continued)

Primary Examiner — Alan B Waits
(74) Attorney, Agent, or Firm — Dinsmore & Shohl LLP; Yongsok Choi, Esq.

(57) ABSTRACT

A wheel bearing assembly may include a wheel hub having a hub flange; one or more inner rings configured to be mounted to one side of the wheel hub; an outer ring provided radially outward of the one or more inner rings; a spacer coupled to a vehicle-body-side end portion of an inner ring disposed on a vehicle-body-side; and one or more rolling elements provided between the one or more inner rings and the outer ring. The one or more inner rings may be configured to be held on the wheel hub by plastically deforming a vehicle-body-side end portion of the wheel hub in a radially outward direction. A plurality of recesses for accommodating rotating elements of a constant velocity joint may be formed on an inner peripheral surface of the vehicle-body-side end portion of the wheel hub in a spaced-apart relationship with each other along a circumferential direction.

8 Claims, 12 Drawing Sheets

(51) Int. Cl.
*B60B 27/00* (2006.01)
*B60B 35/12* (2006.01)

(52) U.S. Cl.
CPC ............ *B60B 35/128* (2013.01); *F16C 25/06* (2013.01); *B60B 2310/54* (2013.01); *F16C 19/185* (2013.01); *F16C 19/186* (2013.01); *F16C 2223/10* (2013.01); *F16C 2326/02* (2013.01)

(58) Field of Classification Search
CPC ............ F16C 2240/80; B60B 27/0005; B60B 27/0036; B60B 27/0078; B60B 27/0084; B60B 27/0094; B60B 35/128; B60B 2310/54; B60B 2380/12
See application file for complete search history.

(56) References Cited

U.S. PATENT DOCUMENTS

2004/0037482 A1* 2/2004 Ouchi ................... F16C 35/063
384/544

2013/0292996 A1* 11/2013 Yokota ................... B60B 27/00
301/109
2014/0199012 A1 7/2014 Galfre et al.
2018/0209482 A1* 7/2018 Suma .................... F16C 33/768

FOREIGN PATENT DOCUMENTS

| KR | 1020030036209 A | 5/2003 |
| KR | 1020080068082 A | 7/2008 |
| KR | 1020100051662 A | 5/2010 |
| KR | 1020170010470 A | 2/2017 |

OTHER PUBLICATIONS

Machine Translation of JP-2004345370-A (Year: 2004).*
Machine Translation of JP 2001-233009 (Year: 2001).*
International Search Report of PCT/KR2018/004965 dated Jan. 24, 2019.

* cited by examiner

WHEEL BEARING ASSEMBLY

CROSS-REFERENCE TO RELATED APPLICATIONS

This application is a continuation of International Application No. PCT/KR2018/004965 filed on Apr. 27, 2018, the entire content of which is herein incorporated by reference.

BACKGROUND

The present disclosure relates to a wheel bearing assembly for rotatably mounting and supporting a vehicle wheel to a vehicle body; more particularly, to a wheel bearing assembly configured such that a constant velocity joint connected to a driving shaft of a vehicle is inserted into a wheel bearing, thus achieving miniaturization and weight reduction.

A wheel bearing for vehicle is a device for rotatably mounting a vehicle wheel to a vehicle body, and may be classified into a wheel bearing for driving wheel mounted to a driving wheel of a vehicle and a wheel bearing for driven wheel mounted to a driven wheel of a vehicle. Among them, the wheel bearing for driving wheel is configured such that a constant velocity joint connected to a driving shaft is coupled to the wheel bearing, and thus a driving force generated in a driving apparatus is transmitted to the wheel bearing through the constant velocity join and then is provided to the wheel.

Referring to FIG. 1, a conventional wheel bearing assembly for driving shaft (so-called third-generation wheel bearing assembly) is exemplarily illustrated. As shown in FIG. 1, the wheel bearing assembly for driving shaft is configured such that a rotating member 10 (wheel hub) to which a wheel is mounted is coupled to a non-rotating member 20 (outer ring) fixed to a vehicle body through rolling elements 30. The wheel mounted on the rotating member 10 (wheel hub) is rotatably mounted and supported to the vehicle body. A constant velocity joint 40 is coupled to one side of the wheel bearing so that a driving force generated in a driving apparatus is transmitted to the wheel bearing. Specifically, the constant velocity joint 40 is coupled to the wheel bearing in a state in which an outer member having rotating elements provided therein is brought into contact with an axial end portion of the wheel bearing. Splines formed on a central shaft 50 of the constant velocity joint 40 are engaged with splines formed on an inner peripheral surface of the wheel hub 10 so that the driving force generated in the driving apparatus is transmitted to the wheel hub 10.

However, since the wheel bearing assembly configured as above is configured such that the constant velocity joint is coupled to the wheel bearing while being connected to the axial end portion of the wheel hub from the outside of the wheel hub, the length of the wheel bearing assembly is increased. In addition, in the wheel bearing assembly configured as above, the splines formed on the outer peripheral surface of the central shaft of the constant velocity joint are engaged with the splines formed on the inner peripheral surface of the wheel hub so as to transmit the driving force to the wheel hub. As a result, the central shaft of the constant velocity joint is required to have a long length so as to pass through the wheel hub. This may increase the weight of the apparatus and may cause a problem that noise is generated upon acceleration and deceleration in the course of transmitting the driving force via the splines.

In order to address such problems, there has been proposed a wheel bearing assembly (so-called fourth-generation wheel bearing assembly) in which a constant velocity joint is inserted into and coupled to a wheel hub of a wheel bearing, as disclosed in Patent Document 1 and the like.

As shown in FIGS. 2 and 3, the fourth-generation wheel bearing assembly is configured such that the constant velocity joint 40 is coupled to the wheel bearing in a state in which a portion of the constant velocity joint 40 is positioned inside the wheel hub of the wheel bearing. As a result, the total length of the wheel bearing assembly may be shortened as much as a length of the constant velocity joint inserted into the wheel hub, thereby reducing the size and weight of the wheel bearing assembly.

However, in the case of the four-generation wheel bearing assembly known in the related art, an outer member 44 is separately provided between the constant velocity joint and the wheel hub to support rotating elements 42 of the constant velocity joint 40 and transfer the driving force to the wheel bearing, and a fixing member 46 is additionally provided on one end of the outer member 44 to prevent deviation of the outer member 44. This results in an increased number of parts and an increase in weight and cost of the product.

PRIOR ART DOCUMENT

Patent Document 1: U.S. Pat. No. 6,790,145

SUMMARY

Technical Problem

The present disclosure is to solve the above-described problems of the prior art, and an object of the present disclosure is to provide a wheel bearing assembly configured such that a constant velocity joint is coupled to a wheel bearing in a state in which the constant velocity joint is inserted into the wheel bearing without additional components, thereby implementing miniaturization and weight reduction.

Technical Solution

According to one embodiment of the present disclosure, there is provided a wheel bearing assembly used for rotatably mounting a vehicle wheel to a vehicle body. The wheel bearing assembly according to one embodiment of the present disclosure may comprise: a wheel hub having a hub flange on which a wheel is mounted; one or more inner rings configured to be press-fitted and mounted to one side of the wheel hub; an outer ring provided radially outward of the one or more inner rings and having a mounting flange, which is formed on an outer peripheral surface of the outer ring and on which a vehicle body is mounted; a spacer coupled to a vehicle-body-side end portion of an inner ring disposed on a vehicle-body-side in the one or more inner rings; and one or more rolling elements provided between the one or more inner rings and the outer ring. Wherein, the one or more inner rings may be configured to be held on the wheel hub by plastically deforming a vehicle-body-side end portion of the wheel hub in a radially outward direction. According to one embodiment of the present disclosure, a plurality of recesses for accommodating rotating elements of a constant velocity joint may be formed on an inner peripheral surface of the vehicle-body-side end portion of the wheel hub in a spaced-apart relationship with each other along a circumferential direction. According to one embodiment of the present disclosure, a heat-treated hardened portion may be formed on the inner peripheral surface of the vehicle-bodyside end portion of the wheel hub and the heat-treated hardened portion may be formed to include at least a region with which the rotating elements of the constant velocity joint are brought into contact. According to one embodiment of the present disclosure, a vehicle-body-side end portion of the spacer may be positioned spaced apart from a vehicle-body-side axial end portion of the heat-treated hardened portion to the vehicle-body-side.

According to one embodiment of the present disclosure, a distance between the vehicle-body-side end portion of the spacer and the vehicle-body-side axial end portion of the heat-treated hardened portion may be formed to be greater than or equal to 2 mm.

According to one embodiment of the present disclosure, before plastically deforming the vehicle-body-side end portion of the wheel hub, a ratio between a height of the vehicle-body-side end portion of the spacer and an axial distance from the vehicle-body-side end portion of the spacer to the vehicle-body-side end portion of the wheel hub may be formed to be greater than or equal to 0.5 and less than or equal to 2.

According to one embodiment of the present disclosure, before plastically deforming the vehicle-body-side end portion of the wheel hub, a reduced-diameter portion having a reduced diameter may be provided on an outer peripheral surface of the vehicle-body-side end portion of the wheel hub, wherein a depth of the reduced-diameter portion may be formed to be greater than or equal to 0.1 mm and less than or equal to 0.5 mm and an axial distance between a portion where the reduced-diameter portion begins and the vehicle-body-side end portion of the spacer may be formed to be greater than or equal to 0.5 mm and less than or equal to 5 mm.

According to one embodiment of the present disclosure, a boot fastening portion may be further provided radially outward of the spacer, wherein at least a portion of the boot fastening portion may be configured to be positioned radially outward of a region between the vehicle-body-side end portion of the heat-treated hardened portion and the vehicle-body-side end portion of the spacer.

According to one embodiment of the present disclosure, the one or more inner rings may comprise a first inner ring for supporting first rolling elements and a second inner ring for supporting second rolling elements, wherein the first inner ring and the second inner ring may be mounted on the wheel hub such that a pitch circle diameter of the first rolling elements is larger than a pitch circle diameter of the second rolling elements. According to one embodiment of the present disclosure, a pre-load transmission member may be provided between the first inner ring and the second inner ring, wherein one surface of the pre-load transmission member may be in contact with the first inner ring and the other surface of the pre-load transmission member may be in contact with the second inner ring.

According to one embodiment of the present disclosure, the wheel bearing assembly may further comprise the constant velocity joint inserted into and coupled to the inner peripheral surface of the vehicle-body-side end portion of the wheel hub, wherein the constant velocity joint may be coupled to the wheel hub such that the rotating elements are received in the recesses formed on the inner peripheral surface of the vehicle-body-side end portion of the wheel hub.

According to one embodiment of the present disclosure, there is provided a wheel bearing assembly used for rotatably mounting a vehicle wheel to a vehicle body. The wheel bearing assembly according to one embodiment of the present disclosure may comprise: a wheel hub having a hub flange on which a wheel is mounted; one or more inner rings configured to be press-fitted and mounted on one side of the wheel hub; an outer ring provided radially outward of the one or more inner rings and having a mounting flange, which is formed on an outer peripheral surface of the outer ring and on which a vehicle body is mounted; and one or more rolling elements provided between the one or more inner rings and the outer ring, wherein the one or more inner rings may be configured to be held on the wheel hub by plastically deforming a vehicle-body-side end portion of the wheel hub in a radially outward direction. According to one embodiment of the present disclosure, a plurality of recesses for receiving rotating elements of a constant velocity joint may be formed on an inner peripheral surface of the vehicle-body-side end portion of the wheel hub in a spaced-apart relationship with each other along a circumferential direction. According to one embodiment of the present disclosure, a heat-treated hardened portion may be formed on the inner peripheral surface of the vehicle-body-side end portion of the wheel hub, wherein the heat-treated hardened portion may be formed to include at least a region with which the rotating elements of the constant velocity joint are brought into contact. According to one embodiment of the present disclosure, a vehicle-body-side end portion of an inner ring disposed on the vehicle-body-side in the one or more inner rings may be positioned spaced apart from a vehicle-body-side axial end portion of the heat-treated hardened portion to the vehicle-body-side.

According to one embodiment of the present disclosure, a distance between the vehicle-body-side end portion of the inner ring disposed on the vehicle-body-side in the one or more inner rings and the vehicle-body-side axial end portion of the heat-treated hardened portion may be formed to be equal to or greater than 2 mm.

According to one embodiment of the present disclosure, before plastically deforming the vehicle-body-side end portion of the wheel hub, a ratio between a height of the vehicle-body-side end portion of the inner ring disposed on the vehicle-body-side in the one or more inner rings and an axial distance from the vehicle-body-side end portion of the inner ring disposed on the vehicle-body-side in the one or more inner rings to the vehicle-body-side end portion of the wheel hub may be formed to be greater than or equal to 0.5 and less than or equal to 2.

According to one embodiment of the present disclosure, before plastically deforming the vehicle-body-side end portion of the wheel hub, a reduced-diameter portion having a reduced diameter may be provided on an outer peripheral surface of the vehicle-body-side end portion of the wheel hub, wherein a depth of the reduced-diameter portion may be formed to be greater than or equal to 0.1 mm and less than or equal to 0.5 mm and an axial distance between a portion where the reduced-diameter portion begins and the vehicle-body-side end portion of the inner ring disposed on the vehicle-body-side in the one or more inner rings may be formed to be greater than or equal to 0.5 mm and less than or equal to 5 mm.

According to one embodiment of the present disclosure, a boot fastening portion may be further provided radially outward of the inner ring located on the side of the vehicle body in the one or more inner rings, wherein at least a portion of the boot fastening portion may be configured to be positioned radially outward of a region between the vehicle-body-side end portion of the heat-treated hardened portion and the vehicle-body-side end portion of the inner ring disposed on the vehicle-body-side in the one or more inner rings.

According to one embodiment of the present disclosure, the one or more inner rings 230 may comprise a first inner ring for supporting first rolling elements and a second inner ring for supporting second rolling elements, wherein the first inner ring and the second inner ring may be mounted on the wheel hub such that a pitch circle diameter of the first rolling elements is larger than a pitch circle diameter of the second rolling elements. According to one embodiment of the present disclosure, a pre-load transmission member may be provided between the first inner ring and the second inner ring, wherein one surface of the pre-load transmission member is in contact with the first inner ring and the other surface of the pre-load transmission member is in contact with the second inner ring.

According to one embodiment of the present disclosure, the wheel bearing assembly may further comprise the constant velocity joint inserted into and coupled to the inner peripheral surface of the vehicle-body-side end portion of the wheel hub, wherein the constant velocity joint may be coupled to the wheel hub such that the rotating elements are received on the recesses formed in the inner peripheral surface of the vehicle-body-side end portion of the wheel hub.

Further, the wheel bearing assembly according to the present disclosure may further comprise other additional configurations without departing from the technical sprit of the present disclosure.

Advantageous Effects

The wheel bearing assembly according to one embodiment of the present disclosure is configured such that recesses for receiving rotating elements of a constant velocity joint are formed on an inner peripheral surface of a wheel hub of a wheel bearing. Further, the wheel bearing assembly according to one embodiment of the present disclosure is configured such that the rotating elements of the constant velocity joint can be stably positioned and supported inside the wheel hub without a separate additional member for supporting an outer surface of the rotating elements. Accordingly, it is possible in the wheel bearing assembly according to one embodiment of the present to reduce the wheel bearing assembly in size and weight.

In addition, the wheel bearing assembly according to one embodiment of the present disclosure is configured such that a heat-treated hardened portion is formed on the inner peripheral surface of the wheel hub, which is in contact with the rotating elements of the constant velocity joint, and the rotating elements of the constant velocity joint can be rotatably supported by the wheel hub while being in direct contact with the wheel hub. This makes it possible to form the wheel bearing assembly having a compact configuration with a relatively smaller number of parts.

In addition, the wheel bearing assembly according to one embodiment of the present disclosure is configured such that the heat-treated hardened portion formed on the inner peripheral surface of the wheel hub is disposed at a position spaced apart from a portion at which a plastic deformation portion begins (a vehicle-body-side end portion of an inner ring or a spacer). This makes it possible to prevent occurrence of a problem that cracks are generated in the wheel hub or damage is exerted on the wheel hub in the process of plastically deforming the vehicle-body-side end portion of the wheel hub for fixing the inner ring to the wheel hub.

Furthermore, the wheel bearing assembly according to one embodiment of the present disclosure controls a ratio between a height of a portion at which the plastic deformation portion begins (the vehicle-body-side end portion of the inner ring or the spacer) and a distance from the portion at which the plastic deformation portion begins to the vehicle-body-side end portion of the wheel hub in an appropriate range. This makes it possible to form the plastic deformation portion capable of stably supporting the inner ring while applying an appropriate pre-load.

In addition, the wheel bearing assembly according to one embodiment of the present disclosure is configured such that a reduced-diameter portion having a reduced diameter is formed in the vehicle-body-side end portion of the wheel hub, and a depth of the reduced-diameter portion and a position at which the reduced-diameter portion begins are controlled in an appropriate range. This makes it possible to prevent deformation of the wheel hub or the durability degradation of the bearing in the process of fixing the inner ring by plastically deforming the vehicle-body-side end portion of the wheel hub.

DETAILED DESCRIPTION

Figure 1:
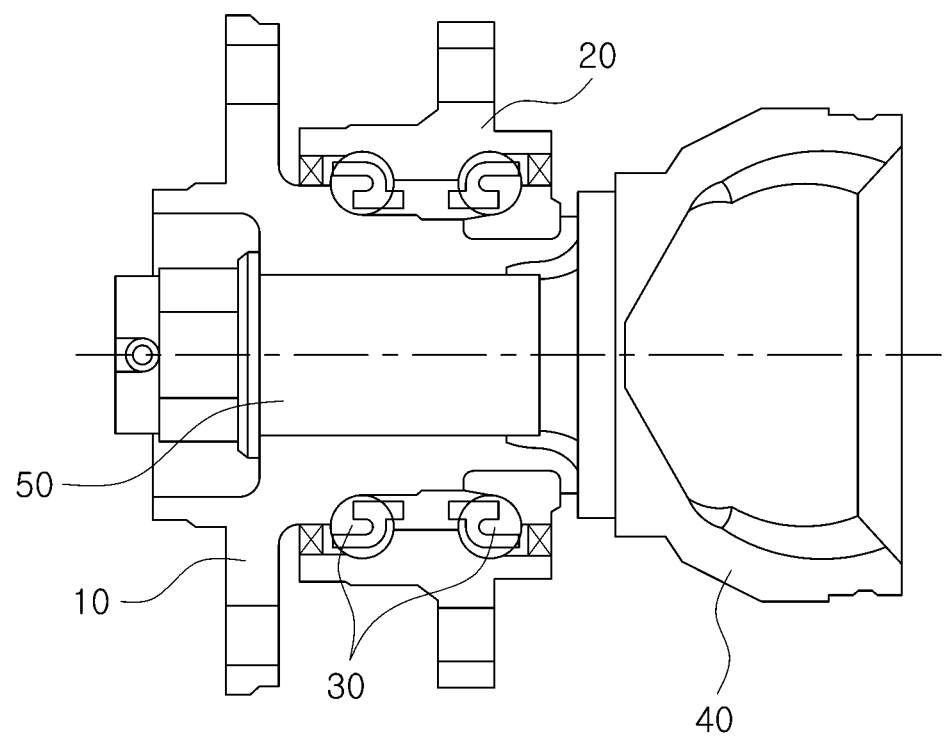
FIG. 1 exemplarily illustrates a conventional wheel bearing assembly for driving wheel (so-called three-generation wheel bearing assembly).

Hereinafter, preferred embodiments of the present disclosure will be described in detail with reference to the accompanying drawings at such an extent that they can be readily practiced by those ordinary skilled in the art.

In order to clearly describe the present disclosure, detailed descriptions of parts irrelevant to the present disclosure will be omitted, and the same reference numerals will be given to the same components throughout the specification. Further, a shape and size of each component shown in the figures are arbitrarily shown for the sake of convenience in description, and hence the present disclosure is not necessarily limited to the shape and size shown. That is, it should be understood that specific shapes, structures, and characteristics described herein may be modified from one embodiment to another embodiment without departing from the spirit and scope of the present disclosure. Positions or arrangements of individual components may also be modified without departing from the spirit and scope of the present disclosure. Therefore, the detailed descriptions described below are not to be taken in a limiting sense, and the scope of the present disclosure is to be taken as covering the scope claimed by the appended claims and their equivalents.

Preferred Embodiments of the Present Disclosure

Figure 4:
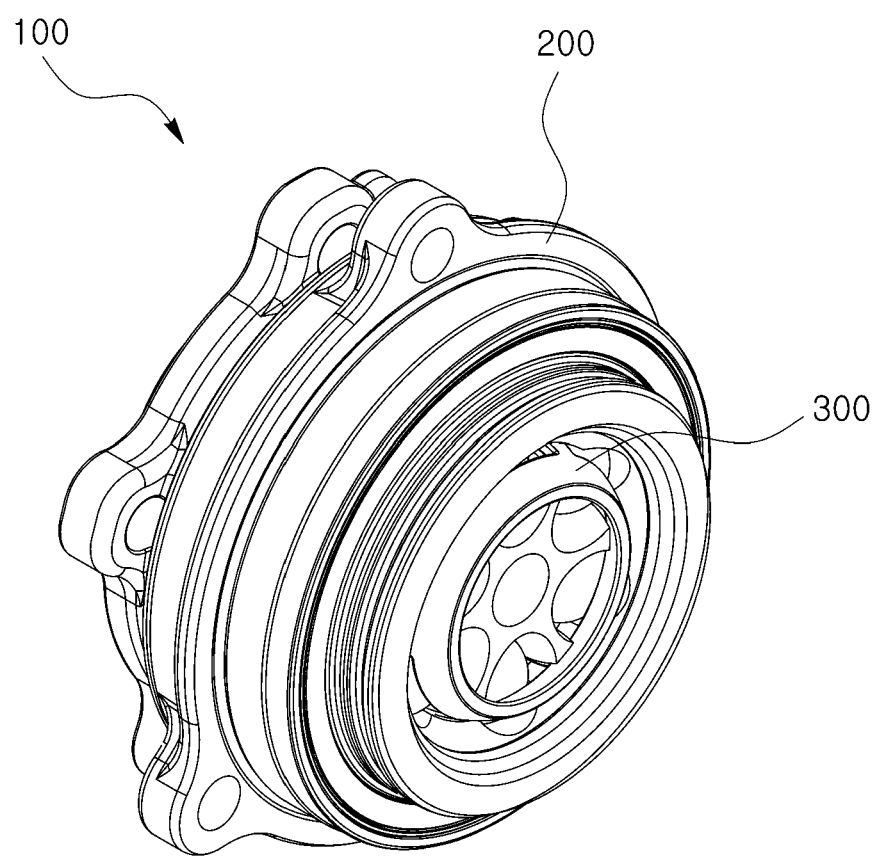
FIG. 4 exemplarily illustrates a perspective view of a wheel bearing assembly according to one embodiment of the present disclosure.
Figure 5:
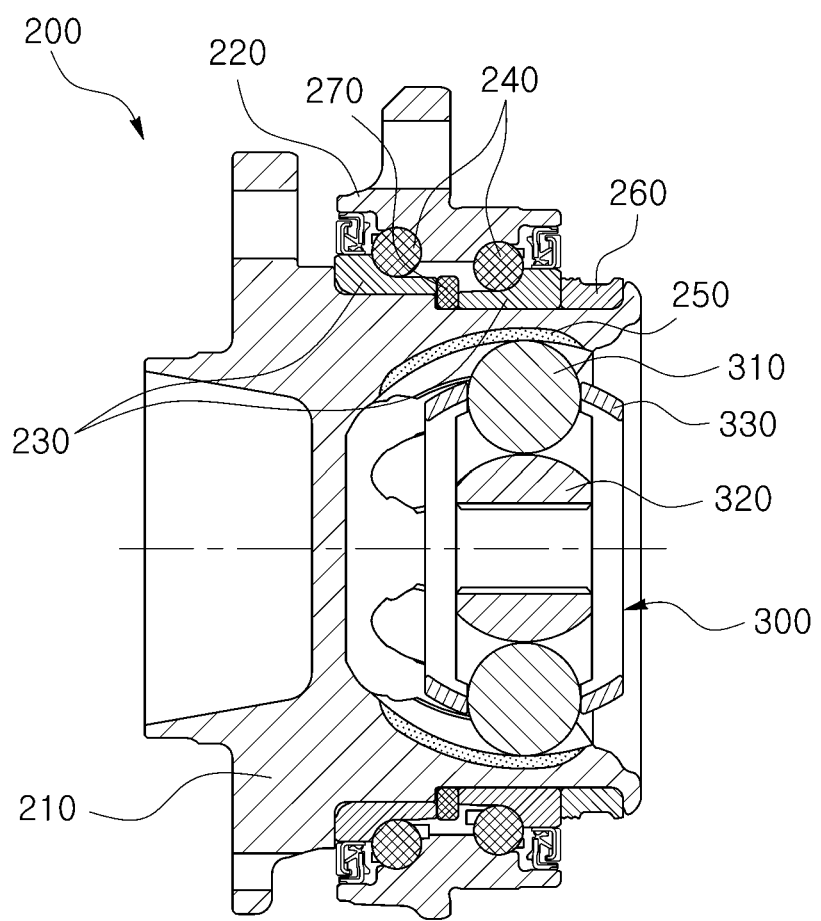
FIG. 5 exemplarily illustrates a cross-sectional structure of the wheel bearing assembly according to one embodiment of the present disclosure.

Referring to FIGS. 4 to 11, a wheel bearing assembly 100 according to one embodiment of the present disclosure is exemplarily illustrated. As shown in FIGS. 4 and 5, the wheel bearing assembly 100 according to one embodiment of the present disclosure may be configured such that a constant velocity joint 300 is coupled to a wheel bearing 200 for rotatably mounting and supporting a wheel to a vehicle body.

According to one embodiment of the present disclosure, the wheel bearing 200 may comprise a wheel hub 210 (rotating member), an outer ring 220 (non-rotating member), an inner ring 230, rolling elements 240, and the like, as a conventional wheel bearing for vehicle.

For example, the wheel hub 210 may be formed to have a generally cylindrical structure that extends along an axial direction, and may have a hub flange 212 provided on one side of an outer peripheral surface of the wheel hub 210. The hub flange 212 may be formed in a shape extending along a circumferential direction of the wheel hub 210, and may be used to mount the wheel to the wheel hub 210 through hub bolts or the like. On the other hand, the wheel hub 210 may have a stepped portion formed on one side of the outer peripheral surface thereof and the inner ring 230 (a first inner ring 230a and a second inner ring 230b) may be mounted on the stepped portion.

The outer ring 220 may be configured to have a mounting flange 222, which is provided on one side of an outer peripheral surface thereof and is used to mount the wheel bearing 200 to the vehicle. Further, the outer ring 220 may be configured to have raceways, with which the rolling elements 240 are brought into contact, on one side of an inner peripheral surface thereof. The raceway (outer raceway) formed on the inner peripheral surface of the outer ring 220 may be configured to cooperate with a raceway (inner raceway) formed on the inner ring 230, which will be described later, to accommodate and support the rolling elements 240, which are rolling members, between the outer raceway and the inner raceway.

The inner ring 230 may be configured to be inserted to the stepped portion of the wheel hub 210 and to be press-fitted with respect to the wheel hub 210. The inner ring 230 may be configured such that the raceway (inner raceway) is provided on a portion of the outer peripheral surface thereof and the rolling elements 240 are supported by such a raceway.

The rolling elements 240 are arranged between the raceway (inner raceway) formed on the inner ring 230 and the raceway (outer raceway) formed on the outer ring 220. The rolling elements 240 perform a function of rotatably supporting the wheel hub 210 to which the wheel is mounted with respect to the outer ring 220 fixed to the vehicle body.

Figure 7:
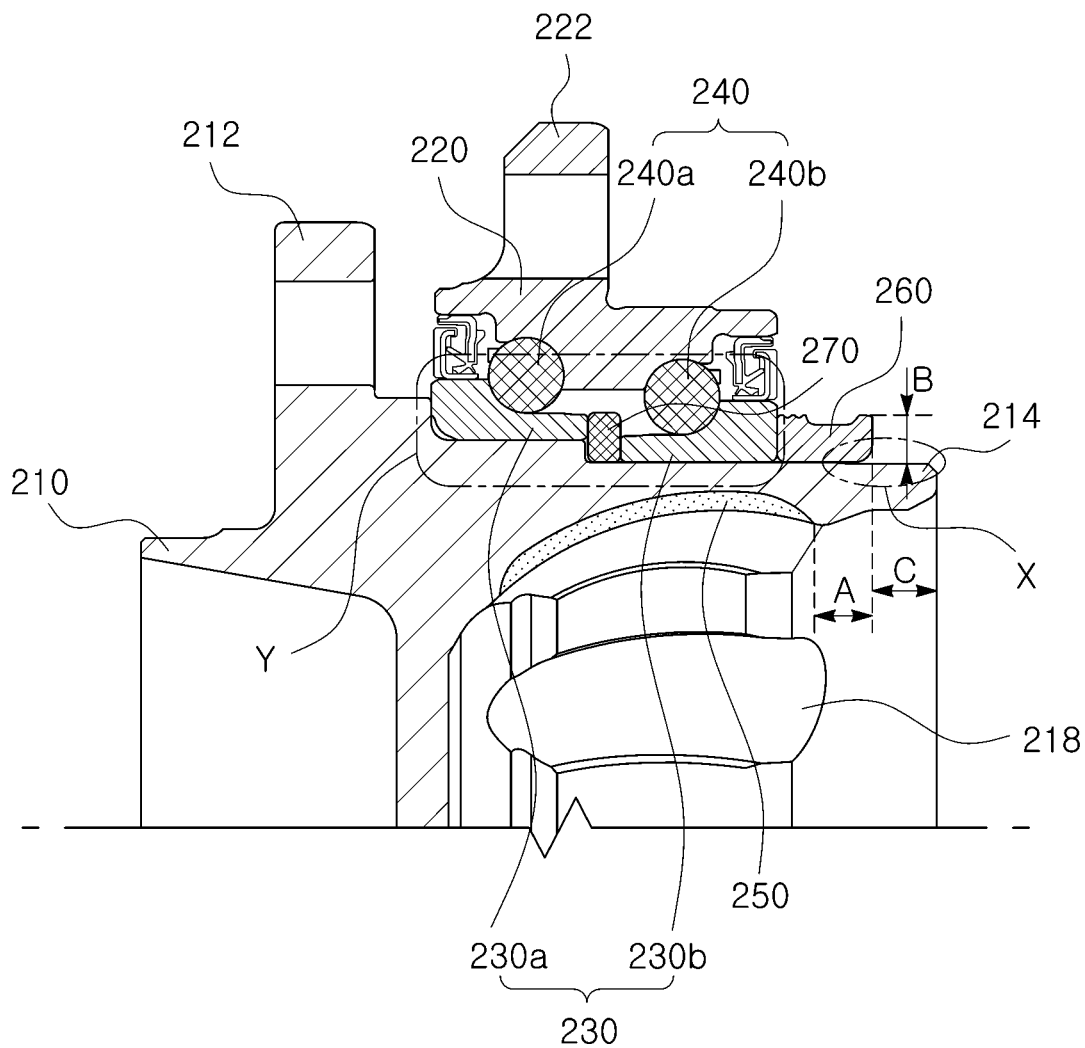
FIG. 7 exemplarily illustrates a cross-sectional structure of the wheel bearing assembly before a wheel hub of the wheel bearing assembly shown in FIG. 5 undergoes a plastic deformation.
Figure 8A:
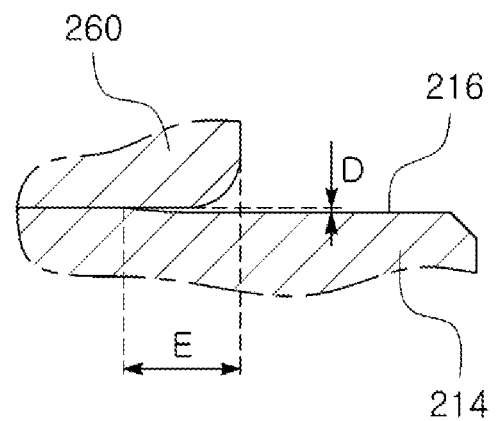
FIG. 8A exemplarily illustrate a partially enlarged view of X portion of FIG. 7.
Figure 8B:
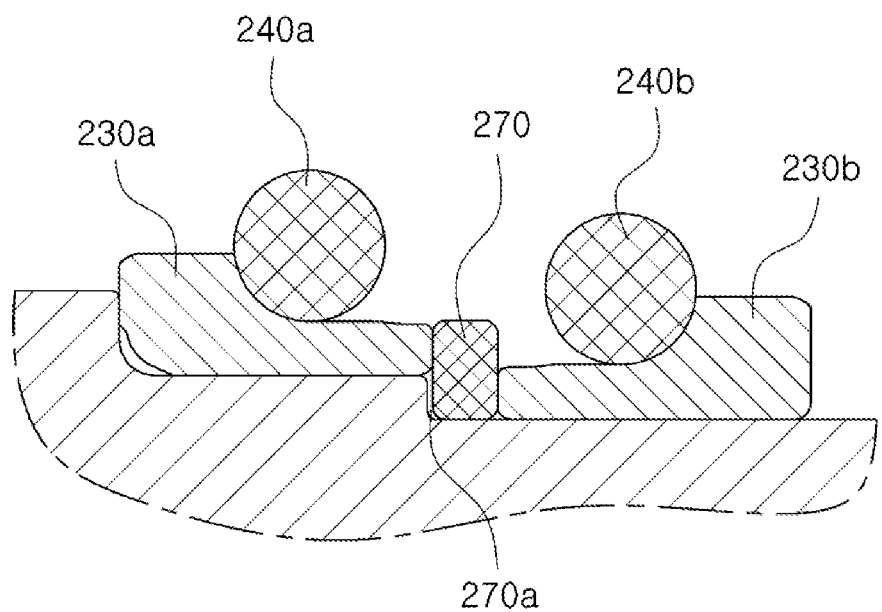
FIG. 8B exemplarily illustrates a partially enlarged view of Y portion of FIG. 7.

According to one embodiment of the present disclosure, the wheel bearing 200 may be configured such that the inner ring 230 is fixed to the wheel hub 210 in a state in which an appropriate pre-load is applied by plastically deforming a vehicle-body-side end portion of the wheel hub 210 in a radially-outward direction, as shown in FIG. 5. To this end, the wheel bearing 200 according to one embodiment of the present disclosure may be configured such that the wheel hub 210 has an extension portion 214 formed to extend toward the vehicle body along the axial direction before the vehicle-body-side end portion of the wheel hub 210 undergoes the plastic deformation, as shown in FIG. 7.

Figure 2:
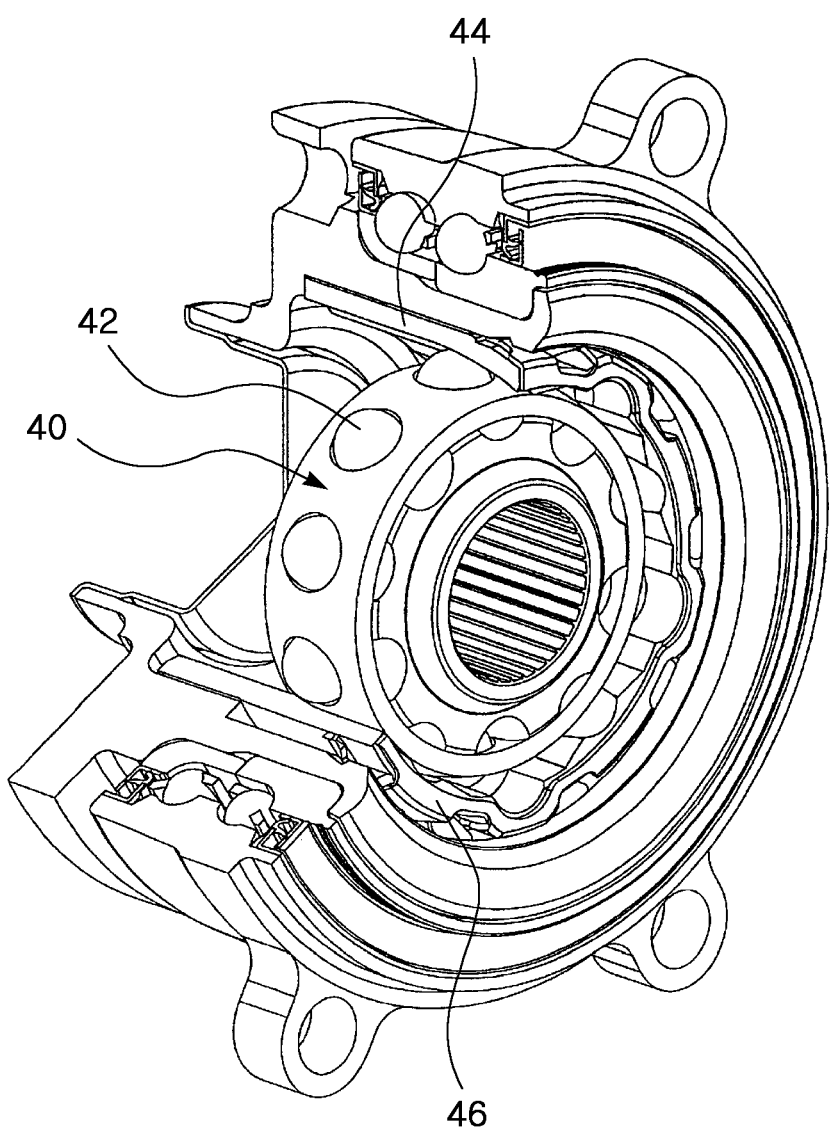
FIG. 2 exemplarily illustrates a conventional fourth-generation wheel bearing assembly.
Figure 3A:
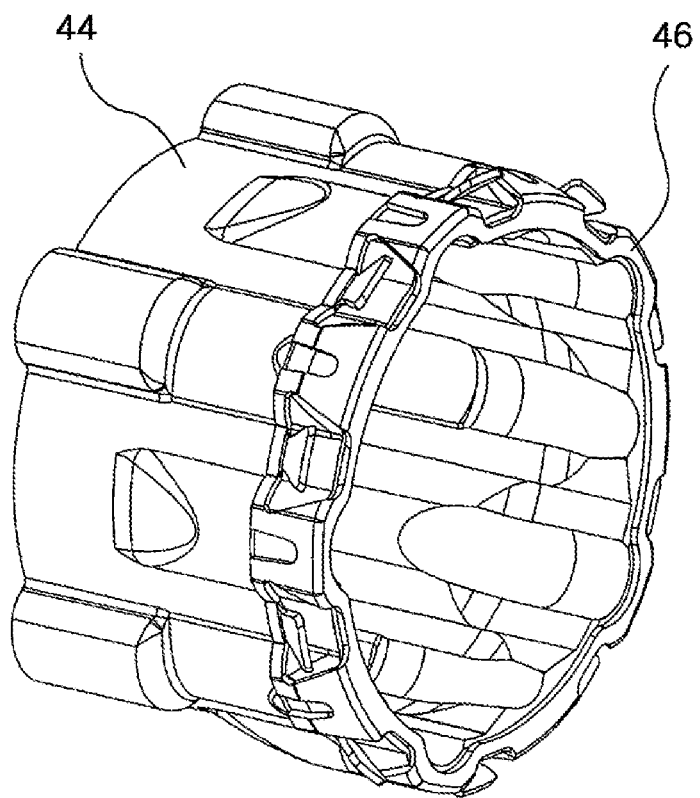
FIG. 3A exemplarily illustrates a conventional fourth-generation wheel bearing assembly.
Figure 3B:
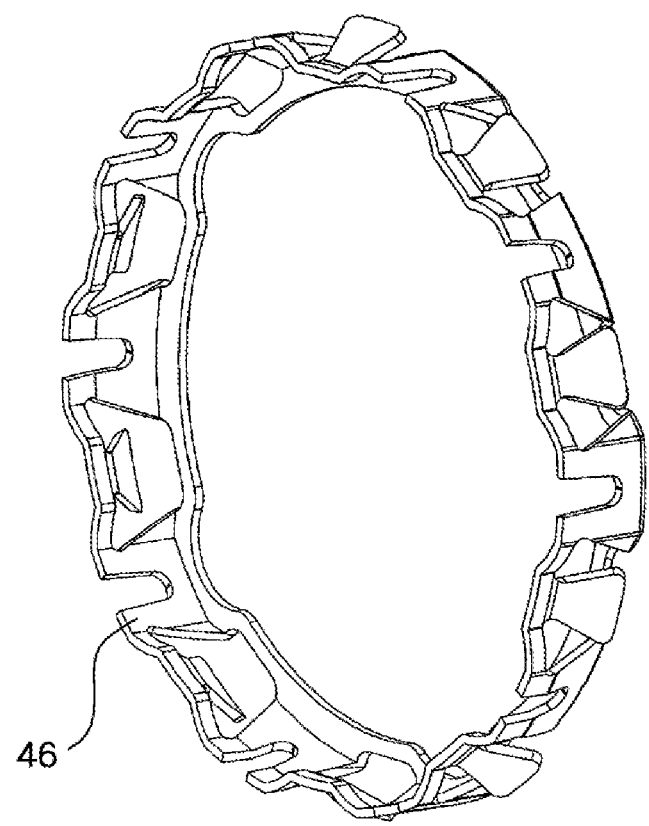
FIG. 3B exemplarily illustrates a conventional fourth-generation wheel bearing assembly.

According to one embodiment of the present disclosure, an inner peripheral surface of the vehicle-body-side end portion of the wheel hub 210 may be configured to perform a function of supporting rotating elements 310 of the constant velocity joint 300 from the outside (the function performed by the outer member provided between the wheel hub and the constant velocity joint in FIGS. 2 and 3). To this end, the wheel bearing 200 according to one embodiment of the present disclosure may be configured such that recesses 218 are provided on the inner peripheral surface of the vehicle-body-side end portion of the wheel hub 210 to receive the rotating elements 310 of the constant velocity joint. The rotating elements 310 of the constant velocity joint 300 may be received in and coupled to the recesses 218. A plurality of recesses 218 may be formed on the inner peripheral surface of the vehicle-body-side end portion of the wheel hub 210 in a spaced-apart relationship with each other along a circumferential direction so as to correspond to the number of rotating elements 310 provided in the constant velocity joint 300.

As described above, the wheel bearing 200 according to one embodiment of the present disclosure is configured such that the rotating elements of the constant velocity joint are supported in direct contact with the inner peripheral surface of the vehicle-body-side end portion of the wheel hub 210. Thus, a raceway having a high strength needs to be formed on the inner peripheral surface of the vehicle-body-side end portion of the wheel hub 210 in contact with the rotating elements 310 of the constant velocity joint 300. Therefore, the wheel bearing 200 according to one embodiment of the present disclosure is configured to have a heat-treated hardened portion 250 formed on the inner peripheral surface of the vehicle-body-side end portion of the wheel hub 210. As a result, the rotating elements 310 of the constant velocity joint 300 can be stably held within the wheel hub 210 without damaging the wheel hub 210.

According to one embodiment of the present disclosure, the heat-treated hardened portion 250 formed on the inner peripheral surface of the vehicle-body-side end portion of the wheel hub 210 may be configured to have a hardened layer which is formed to include at least all portions in contact with the rotating elements 310 of the constant velocity joint 300, so as to ensure the stable rotation and support of the rotating elements 310 of the constant velocity joint 300. The heat-treated hardened portion 250 may be formed through various well-known heat treatment methods such as high-frequency quenching, full-hardening heat treatment, or the like. The heat-treated hardened portion 250 may be formed at a depth of, preferably greater than or equal to 1 mm and less than or equal to 3 mm, more preferably greater than or equal to 2.5 mm and less than or equal to 3 mm, so as to provide sufficient strength to the raceway for the rotating elements 310. On the other hand, the heat-treated hardened portion 250 may be preferably subjected to the heat treatment to have a hardness in a range of Hv 500 to Hv 900 so as to provide sufficient strength for rolling motion of the rotating elements 310 of the constant velocity joint 300.

Meanwhile, in the process of heat-treating the heat-treated hardened portion 250 to provide a high hardness to the heat-treated hardened portion 250, the heat-treated hardened portion 250 may have an increased brittleness. As a result, when the heat-treated hardened portion 250 undergoes the plastic deformation, cracks may be generated in the heat-treated hardened portion 250. This may cause a problem that the durability of the wheel bearing 200 degrades. To prevent such a problem, the wheel bearing 200 according to one embodiment of the present disclosure are configured such that the heat-treated hardened portion 250 is positioned at a position spaced apart from a portion where the plastic deformation begins and thus the heat-treated hardened portion 250 does not undergo the plastic deformation in the process of plastically deforming the vehicle-body-side end portion of the wheel hub 210 for fixing the inner ring 230 to the wheel hub 210. For example, the wheel bearing 200 according to one embodiment of the present disclosure comprises a spacer 260 provided on a vehicle-body-side end portion of the inner ring (the second inner ring 230*b*) disposed on the vehicle-body-side, such that the position where the plastic deformation begins is spaced at a predetermined distance A from the vehicle-body-side axial end portion of the heat-treated hardened portion 250 to the vehicle-body-side along the axial direction.

According to one embodiment of the present disclosure, it is preferable that the axial distance A from the vehicle-body-side axial end portion of the heat-treated hardened portion 250 to the portion where the plastic deformation begins (in the case of the embodiment shown in FIGS. 5 and 6, the vehicle-body-side end portion of the spacer 260) is formed to be greater than or equal to 2 mm. If the distance A between the heat-treated hardened portion 250 and the portion where the plastic deformation begins is formed to be less than 2 mm, the heat-treated hardened portion 250 may undergo the plastic deformation in the process of plastically deforming the vehicle-body-side end portion of the wheel hub 210 for fixing the inner ring 230 to the wheel hub 210, thus damaging the heat-treated portion due to cracks or the like, and resulting in degradation of the durability of the wheel bearing 200.

Figure 6:
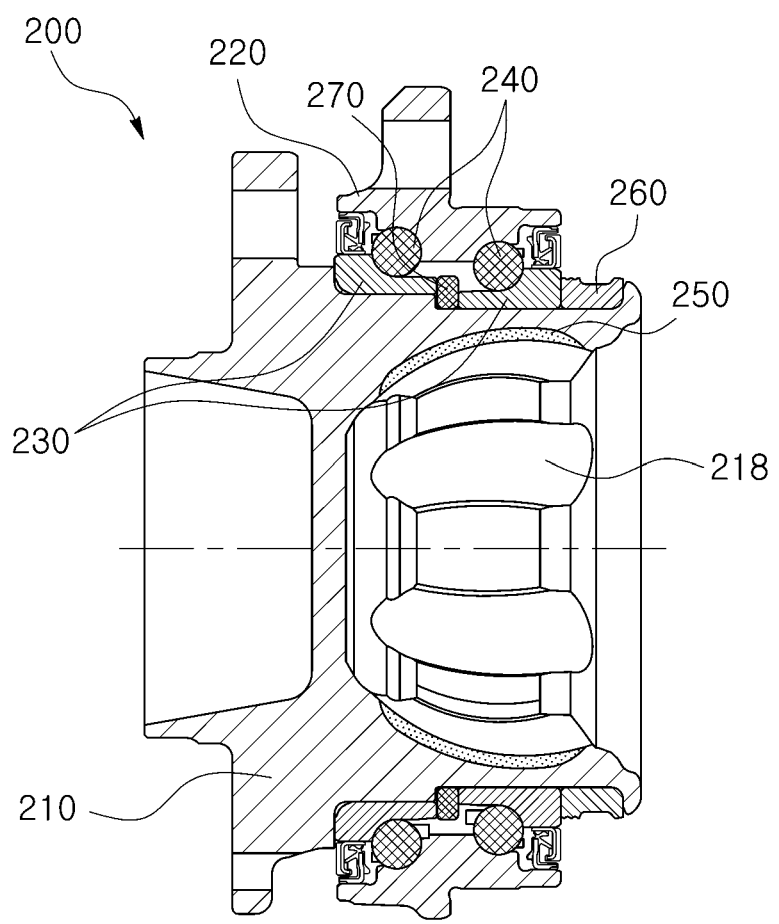
FIG. 6 exemplarily illustrates a cross-sectional structure in which a constant velocity joint is omitted in the wheel bearing assembly shown in FIG. 5.
Figure 9:
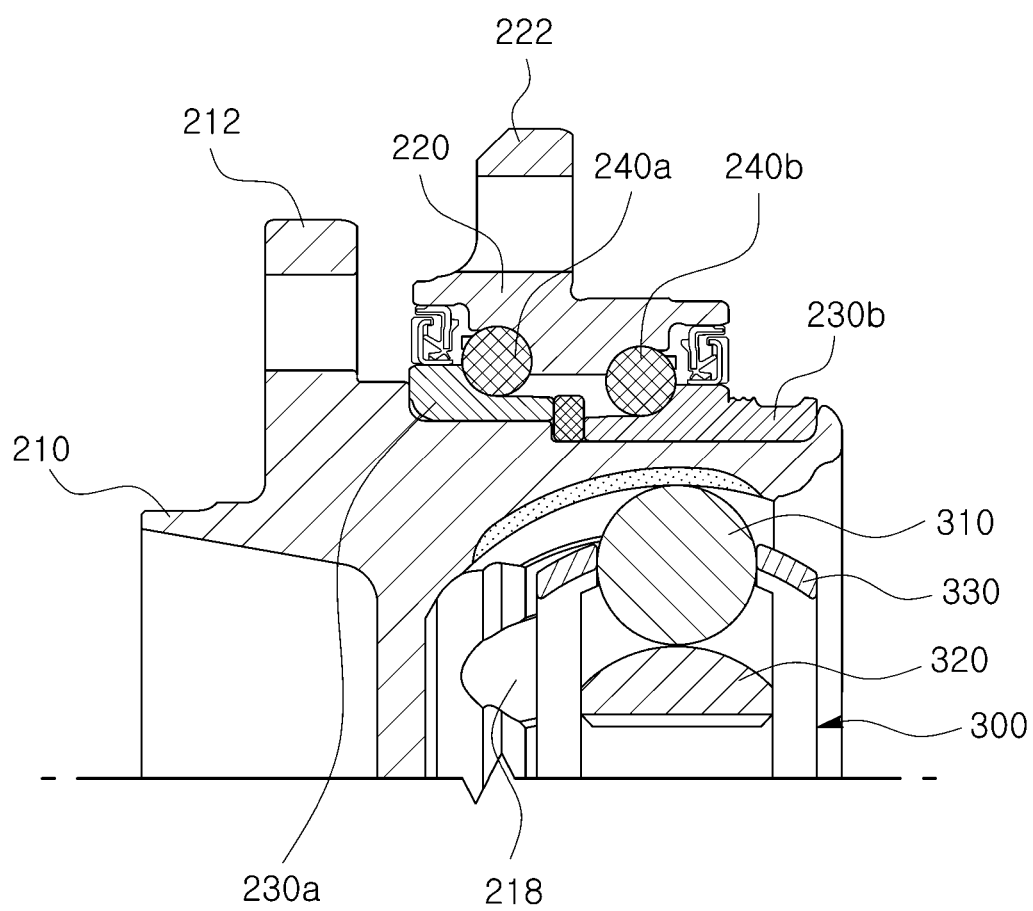
FIG. 9 exemplarily illustrates a modification of the wheel bearing assembly according to one embodiment of the present disclosure.

According to one embodiment of the present disclosure, the spacer 260 may be configured to be formed of a member different from the inner ring and to be coupled to the vehicle-body-side end portion of the inner ring (the second inner ring 230*b*) disposed on the vehicle-body-side, as shown in FIGS. 5 and 6. Alternatively, the spacer may be formed integrally with the inner ring, as shown in FIG. 9. Further, although not shown in the drawings, a boot fastening portion of a rubber boot or the like may be additionally provided in a radially-outward portion of the spacer 260 (in the case in which the spacer is formed integrally with the inner ring as shown in FIG. 9, a radially-outward portion of the corresponding portion of the inner ring). Such a boot fastening portion is preferably configured such that at least a portion thereof can be positioned radially outward of a region between the vehicle-body-side end portion of the heat-treated hardened portion 250 and the vehicle-body-side end portion of the spacer 260 (in the case in which the spacer is formed integrally with the inner ring as shown in FIG. 9, the vehicle-body-side end portion of the inner ring). When the boot fastening portion is provided in the radially-outward portion of the spacer or the inner ring as described above, it is possible to prevent a foreign substance from flowing into the wheel bearing.

According to one embodiment of the present disclosure, a ratio C/B between a height B of the portion where the plastic deformation begins in the wheel bearing (which means a height of the vehicle-body-side end portion of the spacer 260 in the case of the configuration in which the spacer 260 is coupled to the inner ring 230 as shown in FIG. 6, and means a height of the vehicle-body-side end portion of the inner ring in the case in which only the inner ring is formed without the separate spacer as shown in FIG. 9) and a distance C from the portion where the plastic deformation begins to the vehicle-body-side end portion of the wheel hub may be formed to be greater than or equal to 0.5 and less than or equal to 2. If the ratio C/B is formed to be less than 0.5, a height at which a plastically-deformed portion is sufficiently brought into contact with the end portion of the inner ring or the spacer where the plastic deformation begins may not be ensured. As a result, the plastically-deformed portion may not be stably supported and an appropriate pre-load may not be applied to the wheel bearing. In contrast, when the ratio C/B exceeds 2, there is a concern that unnecessary material is accumulated in the portion where the plastic deformation occurs, which may hinder occurrence of an appropriate plastic deformation and may cause an unnecessary increase in weight of the wheel bearing.

According to one embodiment of the present disclosure, in order to prevent damage such as cracks or the like caused by interference with the spacer 260 or the inner ring (the second inner ring 230*b*) disposed on the vehicle-body-side during the plastic deformation, a reduced-diameter portion 216 having a reduced diameter may be provided in the vehicle-body-side end portion of the wheel hub 210. The reduced-diameter portion 216 is preferably formed so that a depth D from the portion where the spacer 260 and/or the vehicle-body-side inner ring (the second inner ring 230*b*) is mounted is formed to be greater than or equal to 0.1 mm and less than or equal to 0.5 mm and a distance E from a starting point of the reduced-diameter portion 216 to the vehicle-body-side end portion of the spacer 260 or the inner ring (the second inner ring 230*b*) located on vehicle-body-side (which means a distance to the vehicle-body-side end portion of the spacer 260 in the case of the configuration in which the spacer 260 is coupled to the inner ring 230 as shown in FIG. 7, and means a distance to the vehicle-body-side end portion of the inner ring in the case in which only the inner ring is provided without a separate member such as a spacer as shown in FIG. 9) is formed in a range of 0.5 mm to 5 mm. When the depth D becomes smaller than 0.1 mm or the distance E becomes smaller than 0.5 mm, there is a concern that stress is concentrated between the edge of the inner ring or the spacer and the plastically-deformed portion in the process of plastically deforming the vehicle-body-side end portion of the wheel hub 210, thus causing cracks. Meanwhile, when the depth D becomes greater than 0.5 mm or the distance E becomes greater than 5 mm, there is a concern that floating may occur between the plastically-deformed portion and the inner ring or the spacer, which results in degradation of the durability of the wheel bearing.

Figure 10:
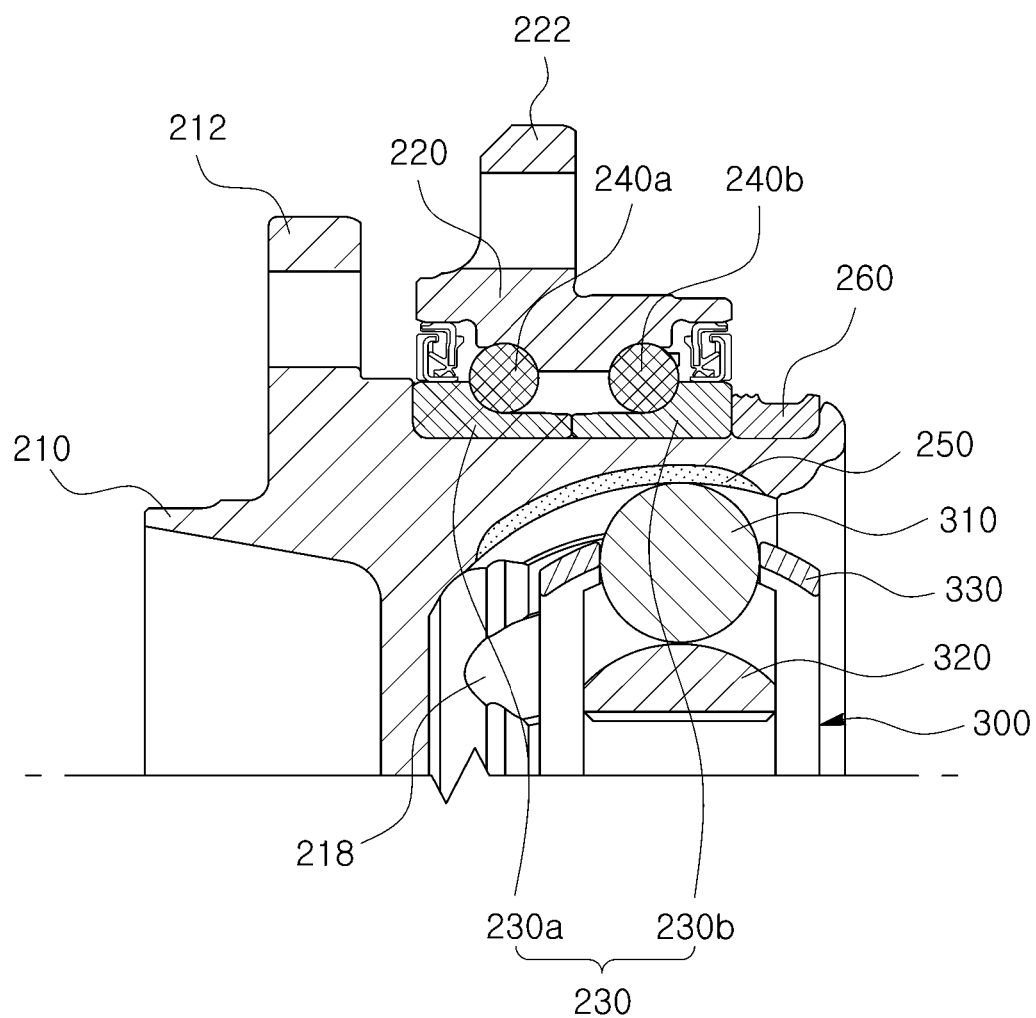
FIG. 10 exemplarily illustrates other modification of the wheel bearing assembly according to one embodiment of the present disclosure.

On the other hand, the wheel bearing 200 according to one embodiment of the present disclosure may be configured to form inner raceways for the plurality of rolling elements 240 on different inner rings (the first inner ring 230a and the second inner ring 230b), as the embodiments shown in FIGS. 4 to 8. In the case of the wheel bearing 200 configured as above, the first inner ring 230a and the second inner ring 230b may be mounted on the wheel hub 210 so that first rolling elements 240a and second rolling elements 240b may be mounted with different pitch circle diameters. However, in the case where the first rolling elements 240a and the second rolling elements 240b are mounted with different pitch circle diameters (e.g., in the case where the first rolling elements 240a are mounted with a larger pitch circle diameter than the second rolling elements 240b), mutually-opposing end portions of the first inner ring 230a and the second inner ring 230b may not be brought into sufficient contact with each other so that the pre-load applied to the second inner ring 230b through the plastic deformation is not properly transmitted to the first inner ring 230a. Thus, there is a risk that a suitable pre-load is not applied to the wheel bearing. Accordingly, in such a case, a pre-load transmission member 270 may be preferably provided between the first inner ring 230a and the second inner ring 230b to properly transmit the pre-load from the second inner ring 230b to the first inner ring 230a, as shown in FIGS. 5 to 8. According to one embodiment of the present disclosure, the pre-load transmission member 270 may be formed of a hollow cylindrical member such that it can be mounted on the wheel hub 210, and may be configured such that one surface thereof is in contact with the first inner ring 230a and another surface thereof is in contact with the second inner ring 230b, thus transmitting the pre-load applied to the second inner ring 230b to the first inner ring 230a through the pre-load transmission member 270. According to one embodiment of the present disclosure, the pre-load transmission member 270 is preferably formed at such a height that the end portions of the first inner ring 230a and the second inner ring 230b located adjacent to the pre-load transmission member 270 may entirely contact with the pre-load transmission member 270 so that the pre-load applied to the second inner ring 230b can be transmitted more sufficiently to the first inner ring 230a. A predetermined gap 270a is preferably formed between the stepped portion of the wheel hub 210 on which the second inner ring 230b is mounted and the pre-load transmission member 270 so that the pre-load applied to the second inner ring 230b can be stably transmitted to the first inner ring 230a without any loss. However, the pre-load transmission member 270 is not necessarily essential. As shown in FIG. 10, the rolling elements mounted on the first inner ring 230a and the rolling elements mounted on the second inner ring 230b may have a similar pitch circle diameter, and mutually-opposing end portions of the first inner ring 230a and the second inner ring 230b may be brought into contact with each other. Alternatively, the pre-load transmission member 270 may be omitted in a wheel bearing assembly configured such that an inner raceway for rolling elements located on the wheel-side is directly formed on the outer peripheral surface of the wheel hub and only one inner ring is used, as shown in FIG. 11.

As shown in FIG. 5, the constant velocity joint 300, which is connected to a driving shaft of a driving apparatus, may be inserted into and coupled to the inner peripheral surface of the vehicle-body-side end portion of the wheel hub 210 that constitutes the wheel bearing 200 according to one embodiment of the present disclosure. As shown in the drawing, the constant velocity joint 300 according to one embodiment of the present disclosure may comprise the rotating elements 310, an inner member 320 that supports the rotating elements 310 from the inside thereof, an intermediate member 330 (cage) having pocket portions into which the rotating elements 310 are inserted, and the like. A through-hole may be formed in the central portion of the inner member 320 of the constant velocity joint 300, and a central shaft connected to the driving shaft of the driving apparatus may be inserted into the through-hole. On the other hand, the wheel bearing assembly 100 according to one embodiment of the present disclosure is configured such that the recesses 218 for accommodating the rotating elements 310 of the constant velocity joint 300 are formed on the inner peripheral surface of the vehicle-body-side end portion of the wheel hub 210 to directly support an outer peripheral surface of the rotating elements 310 of the constant velocity joint 300 through the wheel hub 210 of the wheel bearing 200, as shown in FIG. 5. This makes it possible to insert the constant velocity joint into the wheel hub of the wheel bearing to be coupled with each other, without providing any additional member between the wheel bearing and the constant velocity joint. Accordingly, the size and weight of the wheel bearing assembly may be reduced.

However, the above-described configuration of the constant velocity joint 300 is just one example, and the constant velocity joint 300 used in the wheel bearing assembly 100 according to one embodiment of the present disclosure may be formed to have various well-known configurations in addition to the above-described configuration.

Figure 11:
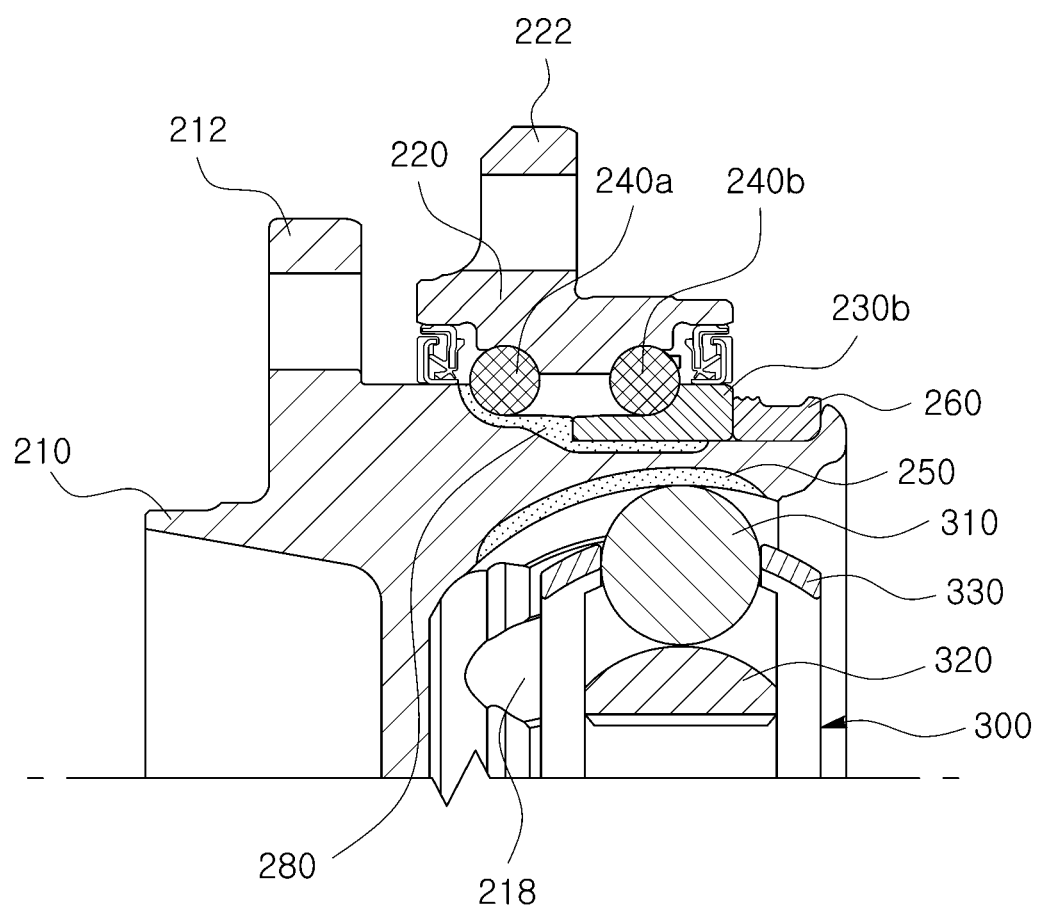
FIG. 11 exemplarily illustrates other modification of the wheel bearing assembly according to one embodiment of the present disclosure.

On the other hand, referring to FIGS. 10 and 11, there are shown wheel bearing assemblies 100 according to other embodiments of the present disclosure. The wheel bearing assemblies 100 shown in FIGS. 10 and 11 are similar in configuration to those in the above-described embodiments except for configurations of inner rings forming the inner raceway for rolling elements. Therefore, detailed descriptions of the same configurations as those in the above-described embodiments will be omitted herein, and the following descriptions will be additionally focused on the differences from the above-described embodiments.

As described above, in the case of the wheel bearing assembly shown in FIG. 10, which is configured such that the plurality of rolling elements are mounted in the wheel bearing at similar pitch circle diameters, and the mutually-opposing end portions of the inner ring (the first inner ring 230a) disposed on the wheel-side and the other inner ring (the second inner ring 230b) disposed on the vehicle-body-side are brought into contact with each other, even if the additional pre-load transmission member is not provided, the preload is properly transmitted from the vehicle-body-side inner ring to the wheel-side inner ring. Thus, there is no need to provide the additional pre-load transmission member between the inner rings. Accordingly, the wheel bearing assembly having the configuration shown in FIG. 10 may be implemented without the pre-load transmission member provided in the above-described wheel bearing assembly, and the other configurations may be similar to those of the above-described wheel bearing assembly.

On the other hand, the wheel bearing assembly shown in FIG. 11 differs from those in the above embodiments in that the inner raceway for the rolling element located on the wheel-side is provided directly on the outer peripheral surface of the wheel hub, rather than a separate inner ring coupled to the wheel hub, and only the inner ring (i.e., the second inner ring 230b) for supporting the rolling elements located on the vehicle-body-side is provided in the wheel bearing assembly.

In the case of the above embodiments, the inner raceways for supporting the rolling elements 240 are all formed in the inner rings (the first inner ring 220a and the second inner ring 220b) coupled to the wheel hub 210. Thus, even if the heat-treated hardened portion is not formed on the outer peripheral surface of the wheel hub 210, the wheel bearing can be properly operated. However, in the case of the wheel bearing assembly shown in FIG. 11, the inner raceway for supporting the inner side of the rolling elements is directly formed on a portion of the outer peripheral surface of the wheel hub 210. Thus, it is necessary to form a hardened layer having a high strength even on the outer peripheral surface of the wheel hub, including the portion where such an inner raceway is formed. To this end, the wheel bearing assembly (so-called three-generation wheel bearing assembly) shown in FIG. 11 may be configured to have a heat-treated hardened portion 280 having a high strength required to form the raceway for the rolling elements. According to one embodiment of the present disclosure, the heat-treated hardened portion 280 may be formed on the outer peripheral surface of the wheel hub, including the portion where the inner raceway for the rolling elements is formed, as shown in the drawing. According to one embodiment of the present disclosure, it is preferable that the heat-treated hardened portion 280 formed on the outer peripheral surface of the wheel hub 210 is configured to extend from a position near the wheel, rather than the inner raceway for the rolling elements formed on the outer peripheral surface of the wheel hub 210, to before the vehicle-body-side end portion of the inner ring (the second inner ring 230b) disposed on the vehicle-body-side. If the heat-treated hardened portion 280 is formed starting from a position on the vehicle-body-side, rather than a portion where the raceway for the rolling elements is formed on the outer peripheral surface of the wheel hub, a sufficient raceway may not be formed on the outer peripheral surface of the wheel hub with which the rolling elements come into contact in a rolling contact manner. This may result in performance degradation and lifespan shortening of the wheel bearing. Conversely, if the heat-treated hardened portion 280 is formed beyond the vehicle-body-side end portion of the inner ring (the second inner ring 230b) disposed on the vehicle-body side, the heat-treated hardened portion 280 may undergo the plastic deformation in the process of plastically deforming the vehicle-body-side end portion of the wheel hub, thus damaging the heat-treated hardened portion 280 due to cracks or the like.

On the other hand, the heat-treated hardened portion 280 formed on the outer peripheral surface of the wheel hub is preferably formed so as not to overlap the heat-treated hardened portion 250 formed on the inner peripheral surface of the wheel hub to support the rotating elements of the constant velocity joint described above. If both the heat-treated hardened portions 250 and 280 are formed to overlap each other, there is a high risk of causing damage such as cracks in a portion where the heat-treated hardened portions overlap. This may be a cause of remarkably degrading the function and lifespan of the wheel bearing.

While the present disclosure has been described above by way of particular features such as specific components and the like, and exemplary embodiments, these embodiments are provided to further facilitate overall understanding of the present disclosure, and the present disclosure is not limited thereto. Various modifications and variations may be made from the above descriptions by those skilled in the art.

Therefore, the spirit of the present disclosure should not be limited to the above-described embodiments, and not only the append claims but also all those modified equally or equivalently to the claims are intended to fall within the scope of the spirit of the present disclosure.

EXPLANATION OF REFERENCE NUMERALS

100: wheel bearing assembly
200: wheel bearing
210: wheel hub
220: outer ring
230: inner ring
240: rolling element
250: heat-treated hardened portion (formed on inner peripheral surface of wheel hub)
260: spacer
270: pre-load transmission member,
280: heat-treated hardened portion (formed on outer peripheral surface of wheel hub)
300: constant velocity joint
310: rotating element
320: inner member
330: intermediate member (cage)

What is claimed is:

1. A wheel bearing assembly comprising:
a wheel hub having a hub flange on which a wheel is mounted;
one or more inner rings configured to be press-fitted and mounted to one side of the wheel hub;
an outer ring provided radially outward of the one or more inner rings and having a mounting flange, which is formed on an outer peripheral surface of the outer ring and on which a vehicle body is mounted;
a spacer coupled to a vehicle-body-side end portion of an inner ring disposed on a vehicle- body-side in the one or more inner rings; and
one or more rolling elements provided between the one or more inner rings and the outer ring,
wherein the one or more inner rings are configured to be held on the wheel hub by plastically deforming a vehicle-body-side end portion of the wheel hub in a radially outward direction,
wherein a plurality of recesses for accommodating rotating elements of a constant velocity joint are formed on an inner peripheral surface of the vehicle-body-side end portion of the wheel hub in a spaced-apart relationship with each other along a circumferential direction,
wherein a heat-treated hardened portion is formed on the inner peripheral surface of the vehicle-body-side end portion of the wheel hub,
wherein the heat-treated hardened portion is formed to include at least a region with which the rotating elements of the constant velocity joint are brought into contact,
wherein a vehicle-body-side end portion of the spacer is positioned spaced apart from a vehicle-body-side axial end portion of the heat-treated hardened portion to the vehicle-body-side,
wherein a distance A between the vehicle-body-side end portion of the spacer and the vehicle-body-side axial end portion of the heat-treated hardened portion is formed to be greater than or equal to 2 mm,
wherein the one or more inner rings comprise a first inner ring for supporting first rolling elements and a second inner ring for supporting second rolling elements,
wherein the first inner ring and the second inner ring are mounted on the wheel hub such that a pitch circle diameter of the first rolling elements is larger than a pitch circle diameter of the second rolling elements, and wherein a pre-load transmission member is provided between the first inner ring and the second inner ring, one surface of the pre-load transmission member being in contact with the first inner ring and the other surface of the preload transmission member being in contact with the second inner ring.

2. The wheel bearing assembly of claim 1, wherein, before plastically deforming the vehicle-body-side end portion of the wheel hub, a ratio C/B between a height B of the vehicle-body-side end portion of the spacer and an axial distance C from the vehicle-body-side end portion of the spacer to the vehicle-body-side end portion of the wheel hub is formed to be greater than or equal to 0.5 and less than or equal to 2.

3. The wheel bearing assembly of claim 1, wherein, before plastically deforming the vehicle-body-side end portion of the wheel hub, a reduced-diameter portion having a reduced diameter is provided on an outer peripheral surface of the vehicle-body-side end portion of the wheel hub, and wherein a depth D of the reduced-diameter portion is formed to be greater than or equal to 0.1 mm and less than or equal to 0.5 mm, and a axial distance E between a portion where the reduced-diameter portion begins and the vehicle-body-side end portion of the spacer is formed to be greater than or equal to 0.5 mm and less than or equal to 5 mm.

4. The wheel bearing assembly of claim 1, further comprising the constant velocity joint inserted into and coupled to the inner peripheral surface of the vehicle- body-side end portion of the wheel hub, wherein the constant velocity joint is coupled to the wheel hub such that the rotating elements are accommodated in the recesses formed on the inner peripheral surface of the vehicle- body-side end portion of the wheel hub.

5. A wheel bearing assembly comprising:
a wheel hub having a hub flange on which a wheel is mounted;
one or more inner rings configured to be press-fitted and mounted to one side of the wheel hub;
an outer ring provided radially outward of the one or more inner rings and having a mounting flange, which is formed on an outer peripheral surface of the outer ring and on which a vehicle body is mounted; and
one or more rolling elements provided between the one or more inner rings and the outer ring,
wherein the one or more inner rings are configured to be held on the wheel hub by plastically deforming a vehicle-body-side end portion of the wheel hub in a radially outward direction,
wherein a plurality of recesses for accommodating rotating elements of a constant velocity joint are formed on an inner peripheral surface of the vehicle-body-side end portion of the wheel hub in a spaced-apart relationship with each other along a circumferential direction,
wherein a heat-treated hardened portion is formed on the inner peripheral surface of the vehicle-body-side end portion of the wheel hub, wherein the heat-treated hardened portion is formed to include at least a region with which the rotating elements of the constant velocity joint are brought into contact, wherein a vehicle-body-side end portion of an inner ring disposed on a vehicle-body-side in the one or more inner rings is positioned spaced apart from a vehicle-body-side axial end portion of the heat-treated hardened portion to the vehicle-body-side, wherein a distance A between the vehicle-body-side end portion of the inner ring disposed on the vehicle-body-side in the one or more inner rings and the vehicle-body-side axial end portion of the heat-treated hardened portion is formed to be equal to or greater than 2 mm, wherein the one or more inner rings comprise a first inner ring for supporting first rolling elements and a second inner ring for supporting second rolling elements, wherein the first inner ring and the second inner ring are mounted on the wheel hub such that a pitch circle diameter of the first rolling elements is larger than a pitch circle diameter of the second rolling elements, and wherein a pre-load transmission member is provided between the first inner ring and the second inner ring, one surface of the pre-load transmission member being in contact with the first inner ring and the other surface of the preload transmission member being in contact with the second inner ring.

6. The wheel bearing assembly of claim 5, wherein, before plastically deforming the vehicle-body-side end portion of the wheel hub, a ratio CB between a height B of the vehicle-body-side end portion of the inner ring disposed on the vehicle-body-side in the one or more inner rings and an axial distance C from the vehicle-body-side end portion of the inner ring disposed on the vehicle-body-side in the one or more inner rings to the vehicle-body-side end portion of the wheel hub is formed to be greater than or equal to 0.5 and less than or equal to 2.

7. The wheel bearing assembly of claim 5, wherein, before plastically deforming the vehicle-body-side end portion of the wheel hub, a reduced-diameter portion having a reduced diameter is provided on an outer peripheral surface of the vehicle-body-side end portion of the wheel hub, and wherein a depth D of the reduced-diameter portion is formed to be greater than or equal to 0.1 mm and less than or equal to 0.5 mm, and an axial distance E between a portion where the reduced-diameter portion begins and the vehicle-body-side end portion of the inner ring disposed on the vehicle-body-side in the one or more inner rings is formed to be greater than or equal to 0.5 mm and less than or equal to 5 mm.

8. The wheel bearing assembly of claim 5, further comprising the constant velocity joint inserted into and coupled to the inner peripheral surface of the vehicle- body-side end portion of the wheel hub, wherein the constant velocity joint is coupled to the wheel hub such that the rotating elements are accommodated in the recesses formed in the inner peripheral surface of the vehicle- body-side end portion of the wheel hub.

\* \* \* \* \*